United States Patent
Zimmer et al.

(10) Patent No.: US 7,293,184 B2
(45) Date of Patent: Nov. 6, 2007

(54) PROGRAMMATIC BINDING FOR POWER MANAGEMENT EVENTS INVOLVING EXECUTION OF INSTRUCTIONS IN A FIRST PROGRAMMING SYSTEM WITH A FIRST INTERFACE AND A SECOND PROGRAMMING SYSTEM WITH A SECOND INTERFACE

(75) Inventors: Vincent J. Zimmer, Federal Way, WA (US); Michael A. Rothman, Puyallup, WA (US); David C. Estrada, Beaverton, OR (US); Andrew J. Fish, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 11/096,842

(22) Filed: Mar. 30, 2005

(65) Prior Publication Data

US 2006/0224904 A1    Oct. 5, 2006

(51) Int. Cl.
G06F 1/32    (2006.01)
(52) U.S. Cl. ........................ 713/320; 719/328
(58) Field of Classification Search ............... 713/300, 713/320; 719/328
See application file for complete search history.

(56) References Cited

U.S. PATENT DOCUMENTS

| 6,105,142 | A * | 8/2000 | Goff et al. .................. 713/324 |
| 6,167,511 | A * | 12/2000 | Lewis .......................... 713/2 |
| 6,868,507 | B1 * | 3/2005 | Gurumoorthy et al. ....... 714/25 |
| 7,058,831 | B2 * | 6/2006 | Cheok et al. ............... 713/320 |
| 2003/0041271 | A1* | 2/2003 | Nalawadi et al. ........... 713/300 |
| 2006/0217103 | A1* | 9/2006 | Velhal et al. ............ 455/343.3 |

OTHER PUBLICATIONS

Lu et al., "Softwar Controlled Power Management", 1999, pp. 157-161.*
Extensible Firmware Interface Specification, Version 1.10, Dec. 1, 2002; Intel Corporation.
Extensible Firmware Interface Specification, Version 1.10 Specification Update Nov. 26, 2003; Intel Corporation, pp. 1-63.
Advanced Configuration and Power Interface Specification, Rev. 3.0, Sep. 2, 2004; Hewlett-Packard Corporation, et al.

* cited by examiner

Primary Examiner—Chun Cao
(74) Attorney, Agent, or Firm—Konrad Raynes & Victor LLP; Rabindranath Dutta

(57) ABSTRACT

A plurality of instructions corresponding to a power management event are received. An instruction of the plurality of instructions is executed in a first programming system with a first interface, in response to determining that the instruction is in accordance with the first interface. The instruction is executed in a second programming system with a second interface, in response to determining that the instruction is not in accordance with the first interface.

24 Claims, 5 Drawing Sheets

PROGRAMMATIC BINDING FOR POWER MANAGEMENT EVENTS INVOLVING EXECUTION OF INSTRUCTIONS IN A FIRST PROGRAMMING SYSTEM WITH A FIRST INTERFACE AND A SECOND PROGRAMMING SYSTEM WITH A SECOND INTERFACE

BACKGROUND

A power management system may attempt to efficiently direct power to different components of a computing device, and may be especially important for portable computing devices that rely on battery power. For example, by reducing power to components that are not being used, a power management system may increase the lifetime of a battery.

Advanced Configuration and Power Interface (ACPI) is a specification that establishes interfaces for operating system directed configuration and power management on laptops, desktops, servers, and other systems. ACPI defines power and configuration management interfaces between an operating system and firmware, such as, a basic input/output system (BIOS).

The ACPI specification includes an ACPI Source Language (ASL) in which system designers may describe the operations of a power management system. ASL code may be compiled into an ACPI Machine Language (AML) which is in a binary pseudo-code format that can be parsed by an ACPI AML interpreter coupled to an operating system. Further details of the ACPI specification may be found in "Advanced Configuration and Power Interface specification", Revision 3.0, published on Sep. 2, 2004 at "www.acpi.info".

The Extensible Firmware Interface (EFI) is a specification that defines a model for an interface between an operating system and platform firmware, such as, BIOS. The EFI includes data tables comprising platform-related information, in addition to boot and runtime service calls that are available to an operating system and an operating system loader. Further details of the EFI specification may be found in the publication "Extensible Firmware Interface Specification," version 1.10, published on Dec. 1, 2002 by INTEL* Corporation.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
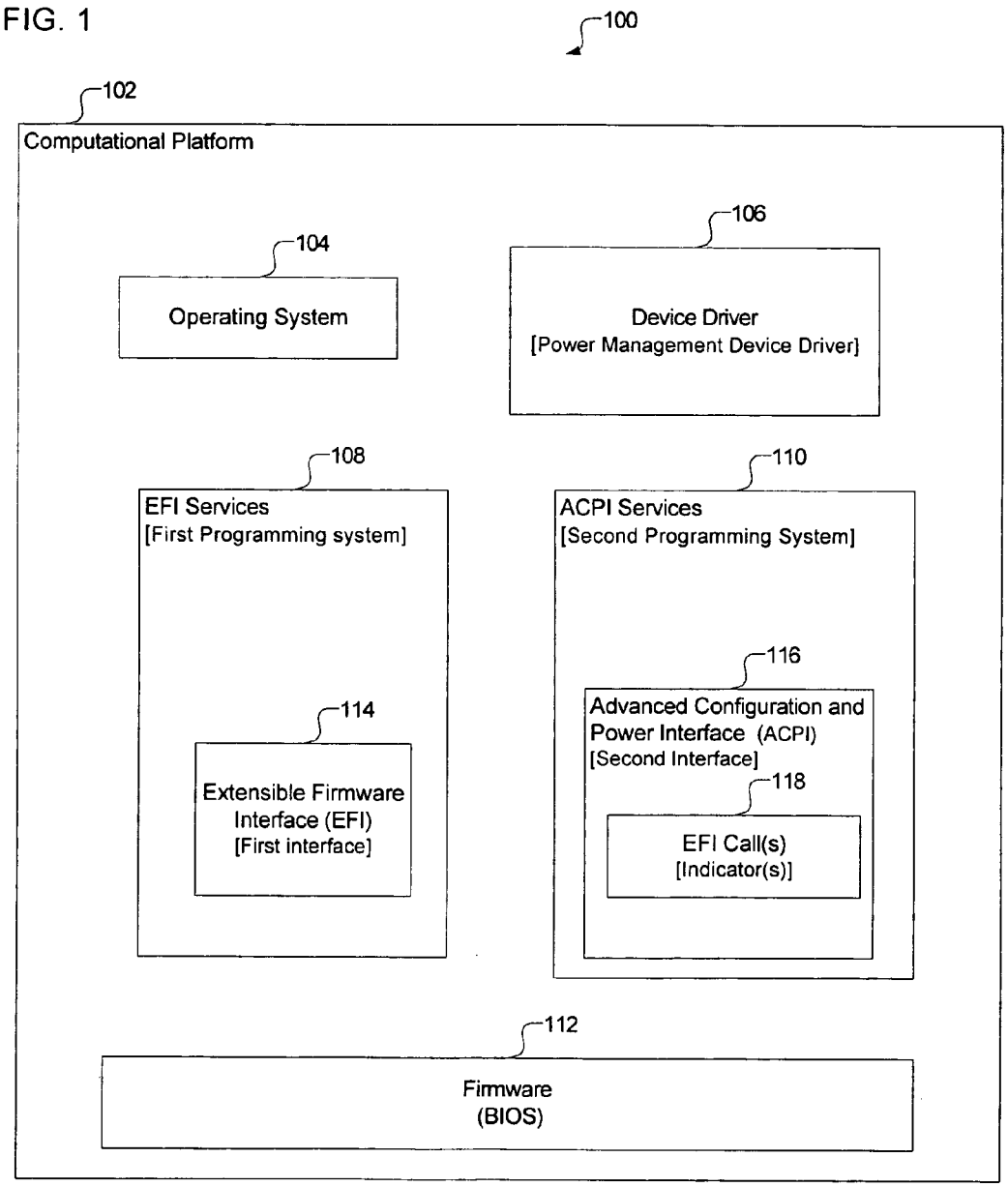
FIG. 1 illustrates a computing environment, in accordance with certain embodiments.

FIG. 1 illustrates a computing environment 100, in accordance with certain embodiments. A computational platform 102 is included in the computing environment 100, where the computational platform 102 may be any suitable device including those presently known in the art, such as, a personal computer, a workstation, a server, a mainframe, a portable computer, a hand held computer, a palm top computer, a telephony device, a network appliance, a blade computer, a storage server, etc. The computational platform 102 may be coupled to a network (not shown), where the network may comprise \* Intel is a trademark or registered trademark of Intel Corporation. the Internet, an intranet, a Local area network (LAN), a Storage area network (SAN), a Wide area network (WAN), a wireless network, etc.

The computational platform 102 includes an operating system 104, a device driver 106, a first programming system, such as, EFI services 108, a second programming system, such as, ACPI services 110, and firmware 112.

The operating system 104 may be any suitable operating system including those presently known in the art, such as, MICROSOFT WINDOWS*, UNIX*, etc. Coupled to the operating system 104 is the device driver 106, where the device driver 106 may comprise a power management device driver that manages power management events and services for the operating system 104.

The EFI services 108 include a first interface, such as, the EFI 114. The EFI services 108 may comprise EFI runtime services and an emulated EFI boot-service space called the EFI virtual machine. The EFI services 108 in association with the EFI 104 allow interactions between the operating system 104 and the firmware 112. The EFI services 108 and the EFI 114 shown in FIG. 1 are exemplary, and in alternative embodiments a first programming system 108 in association with a first interface 114 may allow interactions between the operating system 104 and the firmware 112.

The ACPI services 110 include a second interface, such as, the ACPI 116. In certain embodiments, the ACPI 116 is augmented with an indicator that represents EFI calls 118. The ACPI services 110 in association with the ACPI 116 allow interactions related to power management between the operating system 104 and the firmware 112.

The EFI calls 118 included in the ACPI 116 allow certain power management operations to be directed for processing to the EFI services 108 as opposed to being processed by the ACPI services 110.

In certain embodiments, the EFI services 108 are less hardware specific in comparison to the ACPI services 110. For example, in certain embodiments, the ACPI services 110 may expose hardware specific programming for interfacing with specific hardware registers of a hardware device.

\*MICROSOFT WINDOWS is a trademark or registered trademark of Microsoft Corporation.

\*UNIX is a trademark or registered trademark of the Open Group.

The firmware 112 may include BIOS that has been written into read-only memory (ROM), where the firmware may provide an interface to the hardware of the computational platform 102.

Certain embodiments illustrated in FIG. 1 provide a programming binding of the ACPI services 116 tote EFI services 108, by causing certain power management operations to be directed for processing to the EFI services 108 as opposed to being processed by the ACPI services 110. The ACPI specification may be augmented, such that, the ACPI includes one or more EFI calls 118, where the EFI calls 118 may be used to call the interface provided by the EFI 114.

Figure 2:
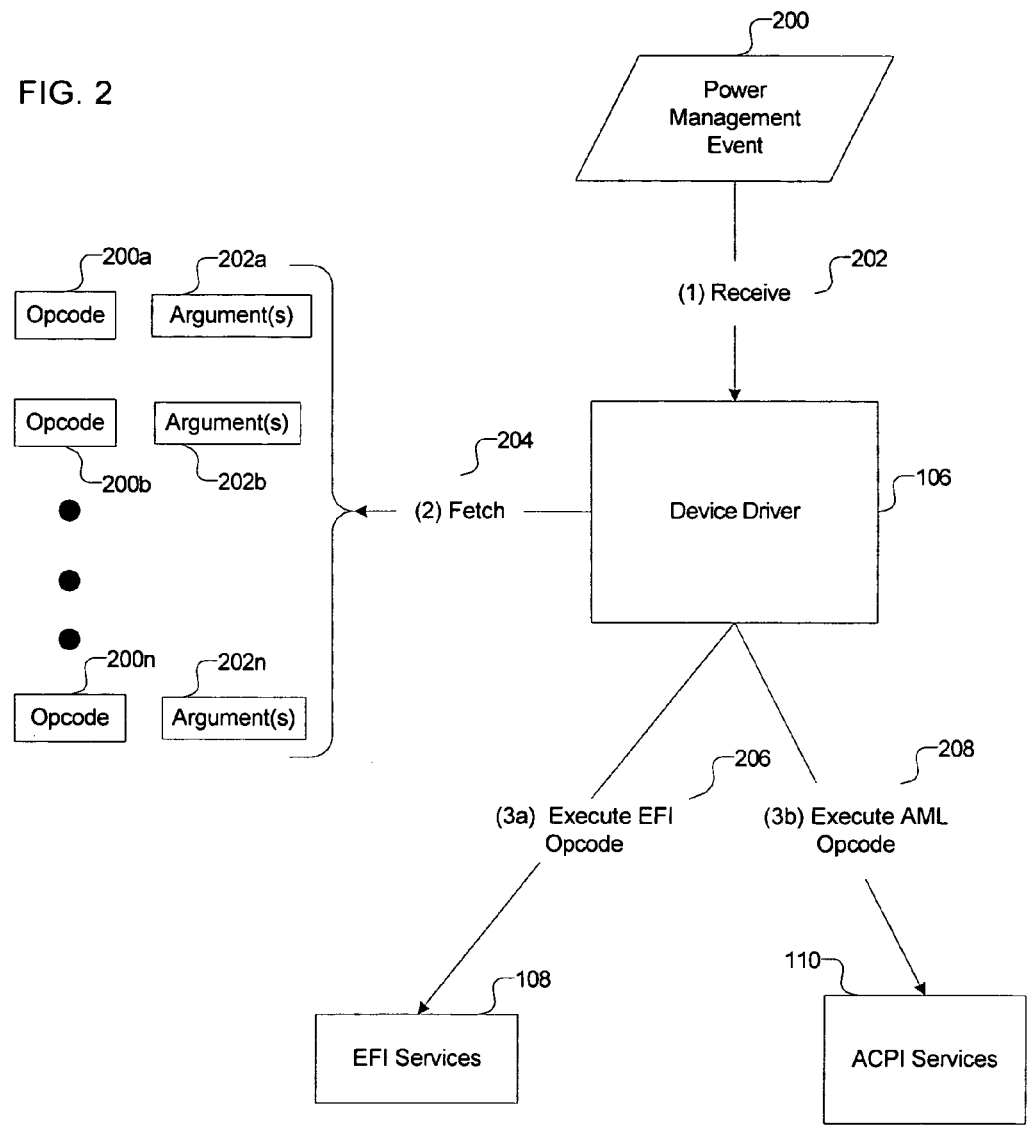
FIG. 2 is illustrates a block diagram of a device driver that fetches and executes EFI and AML opcodes corresponding to power management events, in accordance with certain embodiments.

FIG. 2 illustrates a block diagram of the device driver 106 tat fetches and executes EFI and AML opcodes corresponding to power management events, in accordance with certain embodiments.

A power management event 200 may be generated and the device driver 106 may receive 202 the power management event 200, where the power management event 200 is any event in the computational platform 102 that may potentially lead to adjustments in power to one or more components of the computational platform 102. For example, an exemplary power management event may be generated by placing the computational platform 102 in a suspended state.

The power management event 200 may be described by an AML code comprising a plurality of opcodes 200a, 200b . . . , 200n and a plurality of arguments 202a, 202b, . . . 202n. For example, the opcode 200a with the one or more arguments 202a may comprise an exemplary $1^{st}$ instruction for the AML code, the opcode 200b with one or more arguments 202b may comprise an exemplary $2^{nd}$ instruction for the AML code, and the opcode 200n with one or more arguments 202n may comprise an exemplary $n^{th}$ instruction for the AML code.

The device driver 106 fetches 204 the opcodes 200a . . . 200n and interprets the opcodes 200a . . . 200b. If the device driver 106 determines that a fetched opcode is an opcode that uses the EFI 114, i.e., an EFI opcode, then the device driver 106 initiates the execution 206 of the fetched EFI opcode via the EFI services 108. If the device driver 106 determines that a fetched opcode is not an EFI opcode, then the fetched opcode is a "native" AML opcode, and the device driver 106 initiates the execution 206 of the fetched AML opcode via the ACPI services 110. The term "native" AML opcode is used herein to refer to an opcode provided by the AML specification that has not been augmented with the EFI calls 118.

Since the ACPI is 116 is augmented with the EFI call 118, a power management event described in ASL may be compiled to generate AML, where the AML may in addition to native AML operations may also include EFI operands that correspond to the EFI calls 118.

Certain embodiments illustrated in FIG. 2 allow a power management event 200 to result in AML instructions that include invocations to the EFI 114. As a result, in addition to operations executed by the ACPI services 110, certain operations may also be executed by the EFI services 108 in response to the power management event 200.

Figure 3:
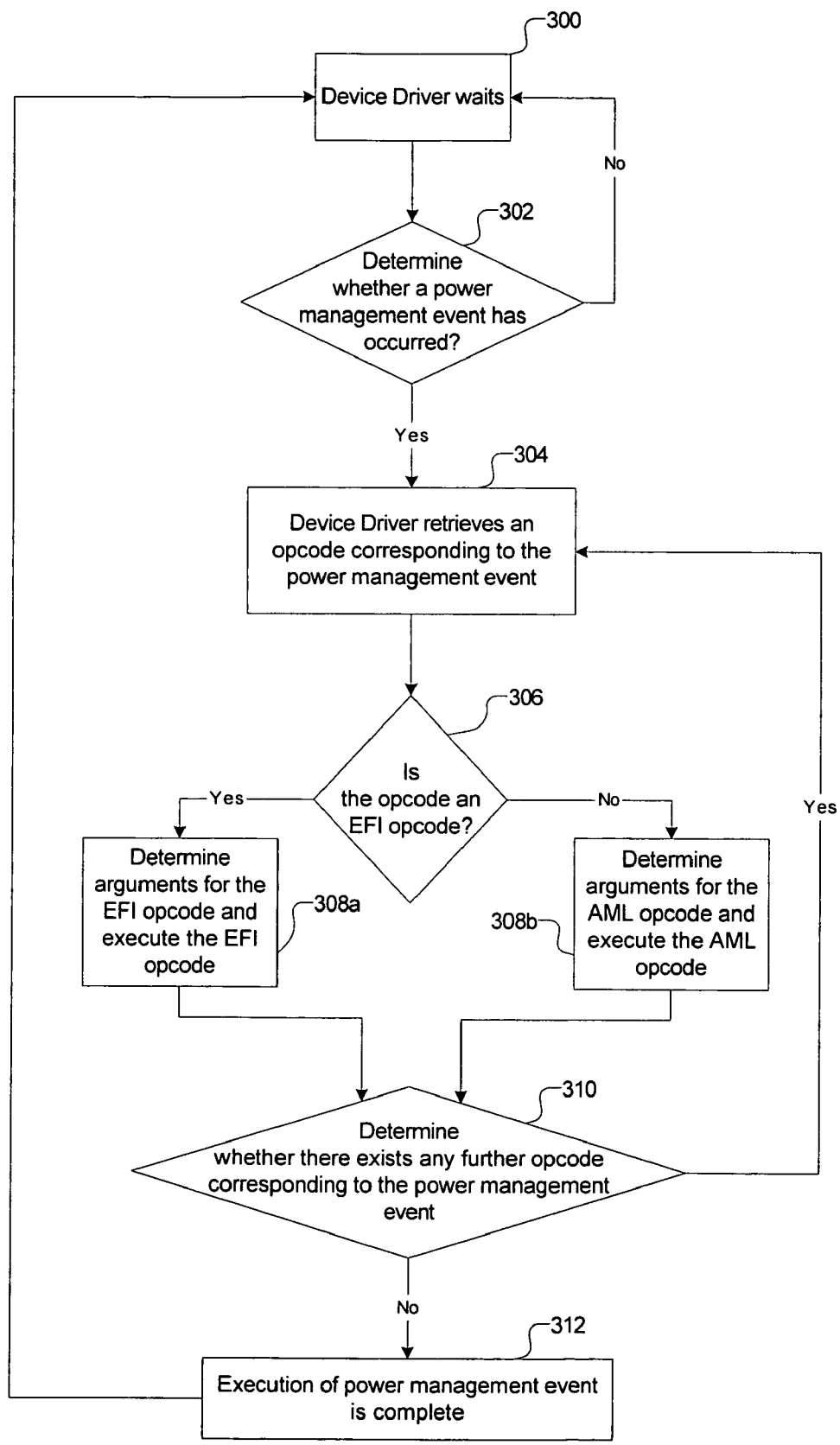
FIG. 3 illustrates first operations for programmatic binding of power management events, in accordance with certain embodiments.

FIG. 3 illustrates first operations for programmatic binding of power management events, in accordance with certain embodiments. The first operations may be implemented the computing platform 102, and in certain embodiments may be implemented in the device driver 106.

Control starts at block 300 where the device driver 106 is waiting. The device driver 106 determines (at block 302) whether a power management event 200 has occurred. If so, then the device driver 106 retrieves (at block 304) an opcode, such as, one of the opcodes 200a . . . 200n, corresponding to the power management event 200.

The device driver 106 determines (at block 306) whether the retrieved opcode is an EFI opcode. If so, then the device driver 106 determines (at block 308a) the arguments for the retrieved EFI opcode and executes the EFI opcode via the EFI services 108. If not, then the retrieved opcode is an AML opcode, and the device driver 106 determines (at block 308b) arguments for the AML opcode and executes the AML opcode via the ACPI services 110.

From blocks 308a, 308b control proceeds to block 310, where the device driver 106 determines the existence of any further opcode corresponding to the power management event 200. If at least one further opcode corresponding to the power management 200 exists, then the device driver 106 returns control to block 304 and retrieves the next opcode. If no further opcode corresponding to the power management event 200 exists, then the execution of the power management event 200 is complete (at block 312) and the device driver again waits (at block 300) for the next power management event to occur. If at block 302 a determination is made that a power management event has not occurred, then the device driver 106 waits (at block 300) once again.

Certain embodiments illustrated in FIG. 3 provide an execution of a programmatic binding of the ACPI services 110 to the EFI services 108. A power management event 200 represented in AML includes both EFI opcodes and "native" AML opcodes. The EFI opcodes correspond to the EFI calls 118. The device driver 106 interprets the AML and directs the EFI opcodes to the EFI services 108 for execution. The "native" AML opcodes are executed by the device driver 106 via the ACPI services 110. While the operations illustrated in FIG. 3 have been described with reference to EFI 114 and ACPI 116, the operations may be performed with other interfaces.

Figure 4:
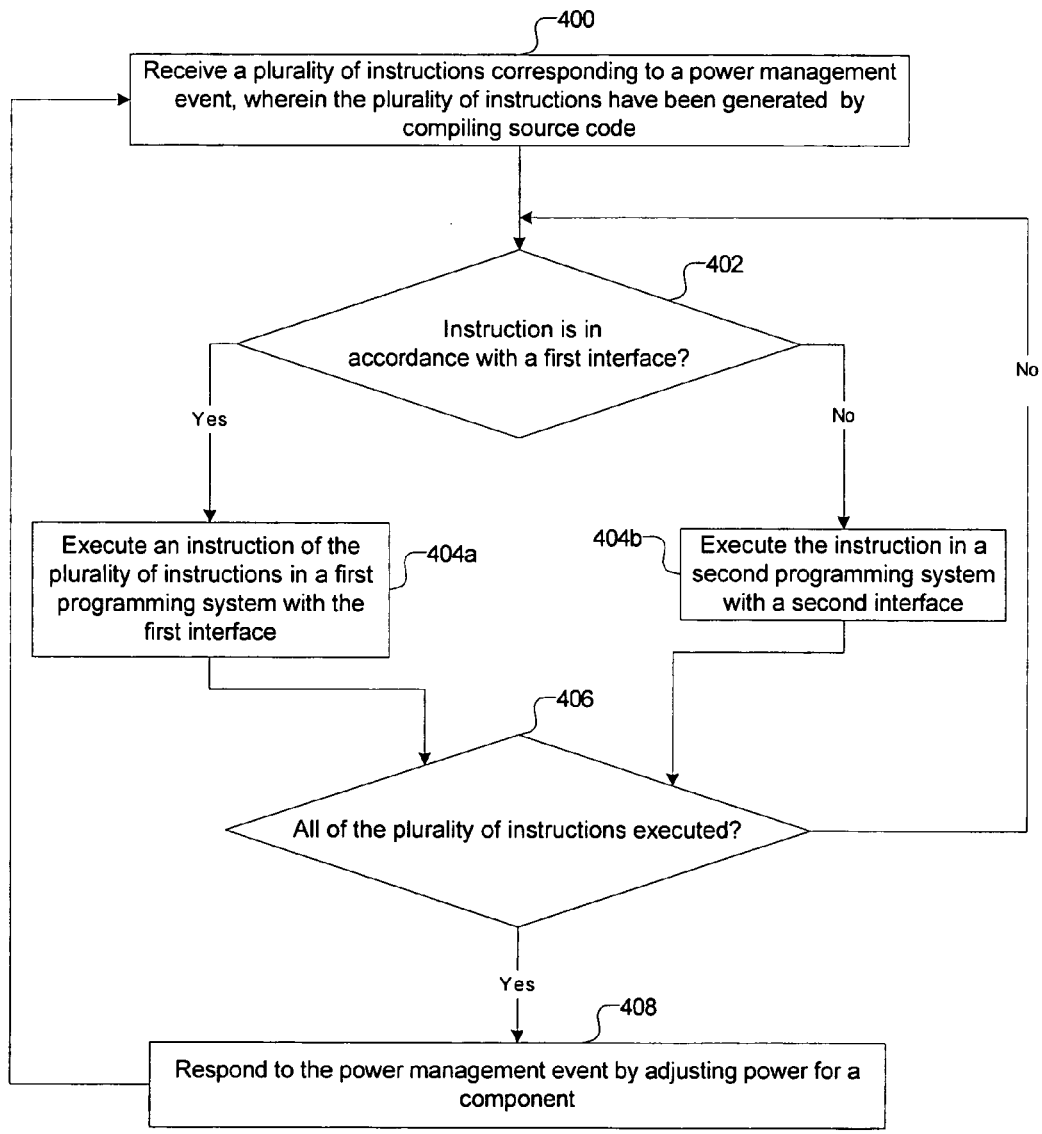
FIG. 4 illustrates second operations for programmatic binding of power management events, in accordance with certain embodiments.

FIG. 4 illustrates second operations for programmatic binding of power management events, in accordance with certain embodiments. The second operations may be implemented the computing platform 102, and in certain embodiments may be implemented in the device driver 106.

Control starts at block 400, where the device driver 106 receives a plurality of instructions corresponding to a power management event, wherein the plurality of instructions have been generated by compiling source code. For example, the plurality of instructions corresponding to the power management event 200 may include the opcodes 200a . . . 200n in association with the arguments 202a . . . 202n. In certain embodiments, the source code from which the instructions have been generated, may be written in accordance with the second interface 116, wherein the plurality of instructions are interpretable, and wherein the second interface 116 includes at least one indicator 118 that allows at least one instruction to be interpreted for execution in the first programming system 108 with the first interface 114.

The device driver 106 determines (at block 402) whether an instruction is in accordance with a first interface 114. In certain embodiments, the first interface 114 may be the EFI interface. If the instruction is in accordance with the first interface 114, then the device driver 106 executes (at block 404a) an instruction of the plurality of instructions in a first programming system 108 with the first interface 114. For example, in certain embodiments the device driver 106 may execute the instruction of the plurality of instructions in the EFI services with the EFI.

If the device driver 106 determines (at block 402) that the instruction is in not in accordance with the first interface 114, then the device driver 106 executes (at block 404b) the instruction in a second programming system 110 with a second interface 116. For example, in certain embodiments the device driver 106 executes the instruction in the ACPI services 110 with the ACPI 116.

From blocks 404a and 404b control proceeds to block 406, where the device driver 106 determines whether all of the plurality of instructions have been executed. If so, then the device driver 106 responds (at block 408) to the power management event 200 by adjusting power for a component of the computational platform 102. If the device driver 106 determines (at block 406) that all of the plurality of instructions have not been executed then the device driver 106 determines (at block 402) whether the next instruction is in accordance with the first interface.

In certain embodiments, an execution environment of the second programming system 110 is bound to the first programming system 108 by allowing a call to be made to the first programming system 108 from the second programming system 110. For example, the call to the first programming system 108 may be made via the indicator 118 in the second interface 116 of the second programming system 110.

In certain embodiments, the first interface 114 and the second interface 116 are capable of interfacing the operating system 104 of the computational platform 102 to the firmware 112 of the computational platform 102, wherein the first interface 114 includes a greater number of device independent interfaces in comparison to the second interface 116.

Certain embodiments illustrated in FIG. 4 provide an execution of a programmatic binding of a first programming system 108 with a second programming system 110, where the first programming system 108 has a first interface 1114, and where the second programming system 110 has a second interface 116.

Certain embodiments allow AML to have a programmatic binding into an EFI environment, by providing ASL source code that can make an EFI invocation via EFI calls. For example, certain embodiments may include a Call_RT_EFI (Call Runtime EFI service) opcode and associated op-regions. An ACPI interpreter may use the Call_RT_EFI opcode to lookup an EFI runtime service identifier in the EFI System Table. An alternate embodiment may include a Call_BS_EFI (Call Boot Service EFI service) which would allow for a user-mode, EFI emulator to execute an EFI driver.

AML may perform rudimentary load/store operations and these rudimentary operations expose the hardware architecture. By using EFI calls exposure of the hardware architecture is reduced in AML. Certain embodiments allow for platform abstraction to be unified and have a more consistent platform interface by using EFI calls that are less hardware dependent in comparison to the AML.

The described techniques may be implemented as a method, apparatus or article of manufacture involving software, firmware, micro-code, hardware and/or any combination thereof. The term "article of manufacture" as used herein refers to program instructions, code and/or logic implemented in circuitry [e.g., an integrated circuit chip, Programmable Gate Array (PGA), Application Specific Integrated Circuit (ASIC), etc.] and/or a computer readable medium (e.g., magnetic storage medium, such as hard disk drive, floppy disk, tape), optical storage (e.g., CD-ROM, DVD-ROM, optical disk, etc.), volatile and non-volatile memory device [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, computer accessible signals propagating through space, computer accessible radio waves, computer accessible infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed. Furthermore, program logic that includes code may be implemented in hardware, software, firmware or many combination thereof. The described operations of FIGS. 1-6 may be performed by a processor or circuitry, where "circuitry" refers to either hardware or software or a combination thereof. The circuitry for performing the operations of the described embodiments may comprise a hardware device, such as an integrated circuit chip, a PGA, an ASIC, etc. The circuitry may also comprise a processor component, such as an integrated circuit, and code in a computer readable medium, such as memory, wherein the code is executed by the processor to perform the operations of the described embodiments.

Figure 5:
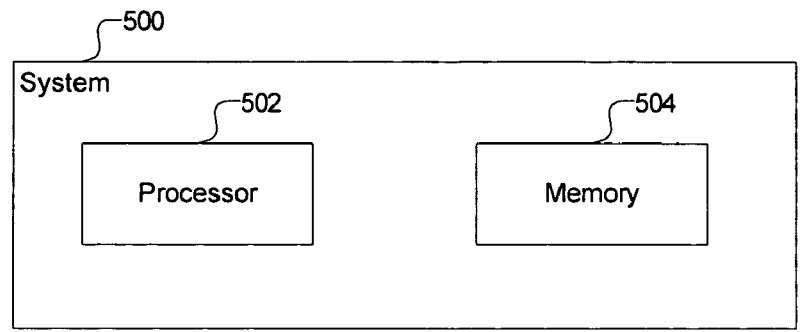
FIG. 5 illustrates a block diagram of a first system including certain elements of the computing environment of FIG. 1, in accordance with certain embodiments.

Certain embodiments illustrated in FIG. 5 may implement a system 500 comprising a processor 502 coupled to a memory 504, wherein the processor 502 is operable to perform the operations described in FIGS. 2-4.

Figure 6:
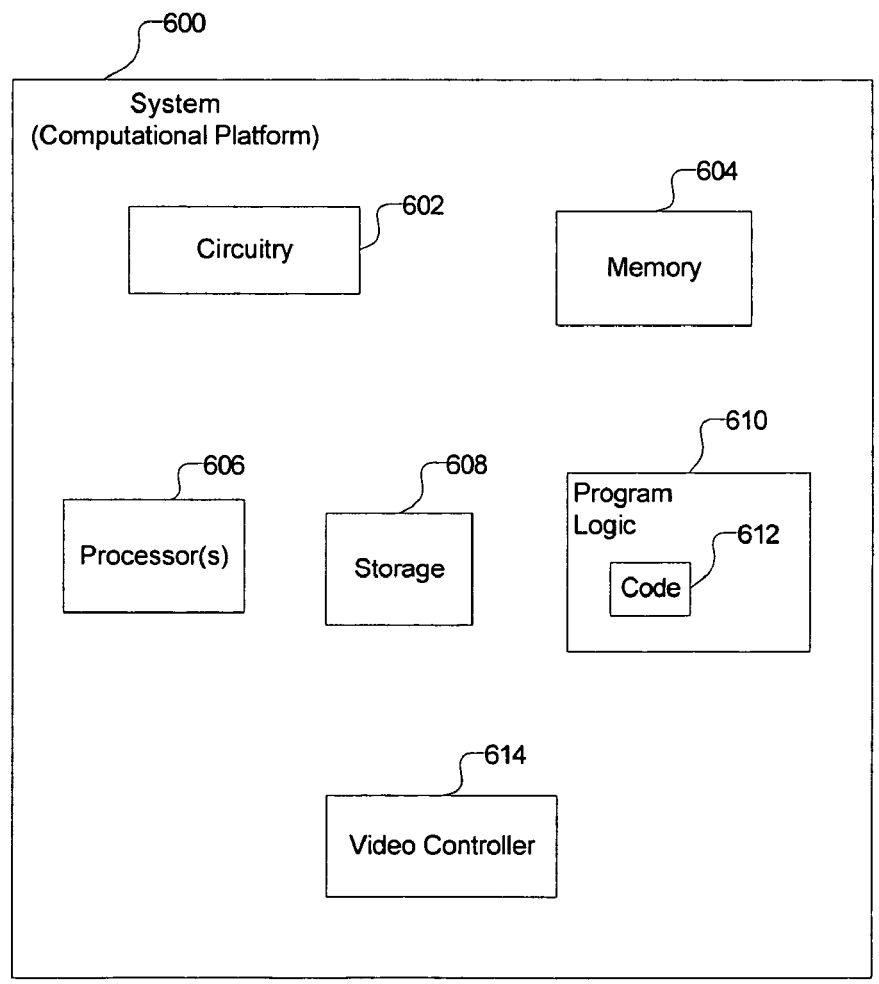
FIG. 6 illustrates a block diagram of a second system including certain elements of the computing environment of FIG. 1, in accordance with certain embodiments.

FIG. 6 illustrates a block diagram of a system 600 in which certain embodiments may be implemented. Certain embodiments may be implemented in systems that do not require all the elements illustrated in the block diagram of the system 600. The system 600 may include circuitry 602 coupled to a memory 604, wherein the described operations of FIGS. 2-4 may be implemented by the circuitry 602. In certain embodiments, the system 600 may include a processor 606 and a storage 608, wherein the storage 608 may be associated with program logic 610 including code 612, that may be loaded into the memory 604 and executed by the processor 606. In certain embodiments the program logic 610 including code 612 is implemented in the storage 608. In certain embodiments, the operations performed by program logic 610 including code 612 may be implemented in the circuitry 602. Additionally, the system 600 may also include a video controller 614. The operations described in FIGS. 2-4 may be performed by the system 600.

Certain embodiments may be implemented in a computer system including a video controller 614 to render information to display on a monitor coupled to the system 600, where the computer system may comprise a desktop, workstation, server, mainframe, laptop, handheld computer, etc. An operating system may be capable of execution by the computer system, and the video controller 614 may render graphics output via interactions with the operating system. Alternatively, some embodiments may be implemented in a computer system that does not include a video controller, such as a switch, router, etc. Also, some embodiments may be implemented in a computer system where the video controller does not have the capability of rendering graphics output but has the capability of rendering text output. Furthermore, in certain embodiments the device may be included in a card coupled to a computer system or may be on a motherboard of a computer system.

Certain embodiments may be implemented in a computer system including a storage controller, such as, a Small Computer System Interface (SCSI), AT Attachment Interface (ATA), Redundant Array of Independent Disk (RAID), etc., controller, that manages access to a non-volatile storage device, such as a magnetic disk drive, tape media, optical disk, etc. Certain alternative embodiments may be implemented in a computer system that does not include a storage controller, such as, certain hubs and switches.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

The data structures and components shown or referred to in FIGS. 1-6 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
  receiving a plurality of instructions corresponding to a power management event;
  executing an instruction of the plurality of instructions in a first programming system with a first interface, in response to determining that the instruction is in accordance with the first interface; and
  executing the instruction in a second programming system with a second interface, in response to determining that the instruction is not in accordance with the first interface.

2. The method of claim 1, further comprising:
  generating the plurality of instructions by compiling source code written in accordance with the second interface, wherein the plurality of instructions are interpretable, wherein the second interface includes at least one indicator that allows at least one instruction to be interpreted for execution in the first programming system with the first interface.

3. The method of claim 2, wherein the first interface includes a greater number of device independent interfaces in comparison to the second interface.

4. The method of claim 3, wherein the first interface is an Extensible Firmware Interface, wherein the second interface is an Advanced Configuration and Power Interface that has been augmented with the at least one indicator, wherein the instruction is executed in the first programming system if the instruction includes an Extensible Firmware Interface opcode, and wherein the instruction is executed in the second programming system if the instruction includes an Advanced Configuration and Power Interface Machine Language opcode.

5. The method of claim 1, further comprising:
  executing an additional instruction of the plurality of instructions, until all of the plurality of instructions have been executed; and
  responding to the power management event by adjusting power for a component.

6. The method of claim 1, wherein the receiving of the plurality of instructions, the executing of the instruction in the first programming system, and the executing of the instruction in the second programming system are performed in a device driver coupled to an operating system.

7. The method of claim 1, wherein an execution environment of the second programming system is bound to the first programming system by allowing a call to be made to the first programming system from the second programming system.

8. The method of claim 1, wherein the first interface and the second interface are capable of interfacing an operating system of a computational platform to a firmware of the computational platform, wherein the first interface includes a greater number of device independent interfaces in comparison to the second interface.

9. A system, comprising: memory; and processor coupled to the memory, wherein the processor is operable to:
  receive a plurality of instructions corresponding to a power management event;
  execute an instruction of the plurality of instructions in a first programming system with a first interface, in response to determining that the instruction is in accordance with the first interface; and
  execute the instruction in a second programming system with a second interface, in response to determining that the instruction is not in accordance with the first interface.

10. The system of claim 9, wherein the processor is further operable to:
  generate the plurality of instructions by compiling source code written in accordance with the second interface, wherein the plurality of instructions are interpretable, wherein the second interface includes at least one indicator that allows at least one instruction to be interpreted for execution in the first programming system with the first interface.

11. The system of claim 10, wherein the first interface includes a greater number of device independent interfaces in comparison to the second interface.

12. The system of claim 11, wherein the first interface is an Extensible Firmware Interface, wherein the second interface is an Advanced Configuration and Power Interface that has been augmented with the at least one indicator, wherein the instruction is executed in the first programming system if the instruction includes an Extensible Firmware Interface opcode, and wherein the instruction is executed in the second programming system if the instruction includes an Advanced Configuration and Power Interface Machine Language opcode.

13. The system of claim 9, further comprising: a component coupled to the memory, wherein the processor is further operable to:
    execute an additional instruction of the plurality of instructions, until all of the plurality of instructions have been executed; and
    respond to the power management event by adjusting power for the component.

14. The system of claim 9, further comprising: an operating system coupled to the memory; and
    a device driver coupled to the operating system, wherein the device driver receives the plurality of instructions, executes the instruction in the first programming system, and executes the instruction in the second programming system.

15. The system of claim 9, wherein an execution environment of the second programming system is bound to the first programming system by allowing a call to be made to the first programming system from the second programming system.

16. The system of claim 9, further comprising:
    an operating system coupled to the memory; and
    a firmware coupled to the memory, wherein the first interface and the second interface are capable of interfacing the operating system to the firmware, and wherein the first interface includes a greater number of device independent interfaces in comparison to the second interface.

17. An article of manufacture, comprising a storage medium having stored therein instructions capable of being executed by a machine to:
    receive a plurality of instructions corresponding to a power management event;
    execute an instruction of the plurality of instructions in a first programming system with a first interface, in response to determining that the instruction is in accordance with the first interface; and
    execute the instruction in a second programming system with a second interface, in response to determining that the instruction is not in accordance with the first interface.

18. The article of manufacture of claim 17, wherein the instructions are further capable of being executed by the machine to:
    generate the plurality of instructions by compiling source code written in accordance with the second interface, wherein the plurality of instructions are interpretable, wherein the second interface includes at least one indicator that allows at least one instruction to be interpreted for execution in the first programming system with the first interface.

19. The article of manufacture of claim 18, wherein the first interface includes a greater number of device independent interfaces in comparison to the second interface.

20. The article of manufacture of claim 19, wherein the first interface is an Extensible Firmware Interface, wherein the second interface is an Advanced Configuration and Power Interface that has been augmented with the at least one indicator, wherein the instruction is executed in the first programming system if the instruction includes an Extensible Firmware Interface opcode, and wherein the instruction is executed in the second programming system if the instruction includes an Advanced Configuration and Power Interface Machine Language opcode.

21. The article of manufacture of claim 17, wherein the machine includes a component, and wherein the instructions are further capable of being executed by the machine to:
    execute an additional instruction of the plurality of instructions, until all of the plurality of instructions have been executed; and
    respond to the power management event by adjusting power for the component.

22. The article of manufacture of claim 17, wherein the machine includes an operating system coupled to a device driver, and wherein the device driver receives the plurality of instructions, executes the instruction in the first programming system, and executes the instruction in the second programming system.

23. The article of manufacture of claim 17, wherein an execution environment of the second programming system is bound to the first programming system by allowing a call to be made to the first programming system from the second programming system.

24. The article of manufacture of claim 17, wherein the first interface and the second interface are capable of interfacing an operating to a firmware, wherein the first interface includes a greater number of device independent interfaces in comparison to the second interface.

* * * * *